(12) United States Patent
Futami et al.

(10) Patent No.: US 6,738,179 B2
(45) Date of Patent: May 18, 2004

(54) METHOD AND DEVICE FOR SHAPING THE WAVEFORM OF AN OPTICAL SIGNAL

(75) Inventors: Fumio Futami, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 243 days.

(21) Appl. No.: 09/994,790

(22) Filed: Nov. 28, 2001

(65) Prior Publication Data

US 2003/0002135 A1 Jan. 2, 2003

(30) Foreign Application Priority Data

Jun. 29, 2001 (JP) ........................................ 2001-199202

(51) Int. Cl.⁷ ............................... G02F 1/37; G02F 2/02
(52) U.S. Cl. ........................................ 359/328; 359/326
(58) Field of Search .................................. 359/326–332

(56) References Cited

U.S. PATENT DOCUMENTS 6,130,566 A * 10/2000 Yokomizo .................... 327/175
6,351,081 B1 * 2/2002 Hwang ........................ 315/224

FOREIGN PATENT DOCUMENTS

JP 10078595 A 3/1998 ............. G02F/2/02

OTHER PUBLICATIONS

N. Edagawa, et al. "Novel Wavelength Converter Using An Electroabsorption Modulator", IEICE Transactions on Electronics, vol. E81–C, No. 8, pp. 1251–1257, Aug. 1998.

Tomoyuki Akiyama et al., "Application of Spectral–Hole Burning in the Inhomogeneously Broadened Gain of Self–Assembled Quantum Dots to a Multiwavelength–Channel Nonlinear Optical Device", IEEE Photonics Technology Letters, vol. 12, No. 10, pp. 1301–1303, Oct. 2000.

T. Akiyama, "WDM Multi–Channel Nonlinear Device Utilizing Inhomogeneously–Broadened Gain of Self–Assembled Quantum Dots", 26$^{th}$ European Conference on Optical Communication, Sep. 3–7, 2000, Munich, Germany.

M. Suzuki, et al., Effect of Hole Pile–Up At Heterointerface on Modulation Voltage in GainAsP Electroabsorption Modulators, Electronics Letters, 19$^{th}$ Jan., 1989, vol. 25, No. 2, pp. 88–89.

\* cited by examiner

*Primary Examiner*—John D. Lee
(74) *Attorney, Agent, or Firm*—Staas & Halsey LLP (57) ABSTRACT

In the method according to the present invention, an optical signal is input into a first optical gate to suppress a space-level noise of the optical signal. Subsequently, an optical signal output from the first optical gate is input into a second optical gate to suppress a mark-level noise of the optical signal output from the first optical gate. With this configuration, the waveform of the optical signal can be shaped without O/E conversion. For example, waveform shaping independent of the modulation rate and format of the optical signal can be performed.

24 Claims, 6 Drawing Sheets

METHOD AND DEVICE FOR SHAPING THE WAVEFORM OF AN OPTICAL SIGNAL

BACKGROUND OF THE INVENTION

1. Field of the Invention

The present invention relates to a method and device for shaping the waveform of an optical signal.

2. Description of the Related Art

The modulation rate of a signal used in optical fiber communication continues to increase year after year. At present, a high-speed system having a modulation rate of 2.5 Gb/s or 10 Gb/s per channel is in actual use. Further, optical transmission employing a modulation rate of 40 Gb/s per channel is being examined in a system under investigation.

Various formats such as NRZ and RZ formats are used for an optical signal to increase a modulation rate. Further, an optical amplifier for compensating for loss of an optical signal to increase a transmission distance is in actual use. For example, a rare earth doped optical amplifier characterized in direct amplification, typically such as an erbium doped fiber amplifier (EDFA), is in actual use. A repeater employing such an optical amplifier is used to compensate for a reduction in power of an optical signal due to transmission loss by an optical fiber.

The optical amplifier is an analog amplifier, and it can therefore amplify an optical signal in an arbitrary format. However, in amplifying an optical signal, the optical amplifier always adds amplified spontaneous emission (ASE) to the optical signal, so that the signal-to-noise ratio (SN ratio) of the optical signal is reduced by the amplification.

Accordingly, the SN ratio decreases with an increase in the number of repeaters, causing a limit to a transmission distance. The nonlinear optical-effects and group velocity dispersion in an optical fiber increase the ASE to degrade the waveform of an optical signal, causing a transmission limit.

To break down such a transmission limit, regenerative repeating is required before bit error becomes excessive.

It is estimated that wavelength division multiplexing (WDM) will be extensively applied to a future photonic network. Accordingly, it is expected that different modulation rates of 2.5 Gb/s, 10 Gb/s, and 40 Gb/s, for example, will be mixed for optical signals in WDM channels. Further, the formats of optical signals in WDM channels are considered to be different from each other. Accordingly, such a network is required to employ a regenerative repeater capable of performing a transparent operation independent of the modulation rates and formats of optical signals.

In a regenerative repeater using an electrical circuit, there is a limit such as an electrical band limit, and it is therefore difficult to realize such a transparent operation. In an all-optical regenerative repeater capable of performing all kinds of signal processing in optical level, the above-mentioned limit is almost eliminated to allow a transparent operation.

The functions required for the all-optical regenerative repeater are amplitude restoration or reamplification, waveform shaping or reshaping, and timing restoration or retiming. These functions are referred to as 3R functions, and in particular, the first and second functions are referred to as 2R functions.

Figure 1:
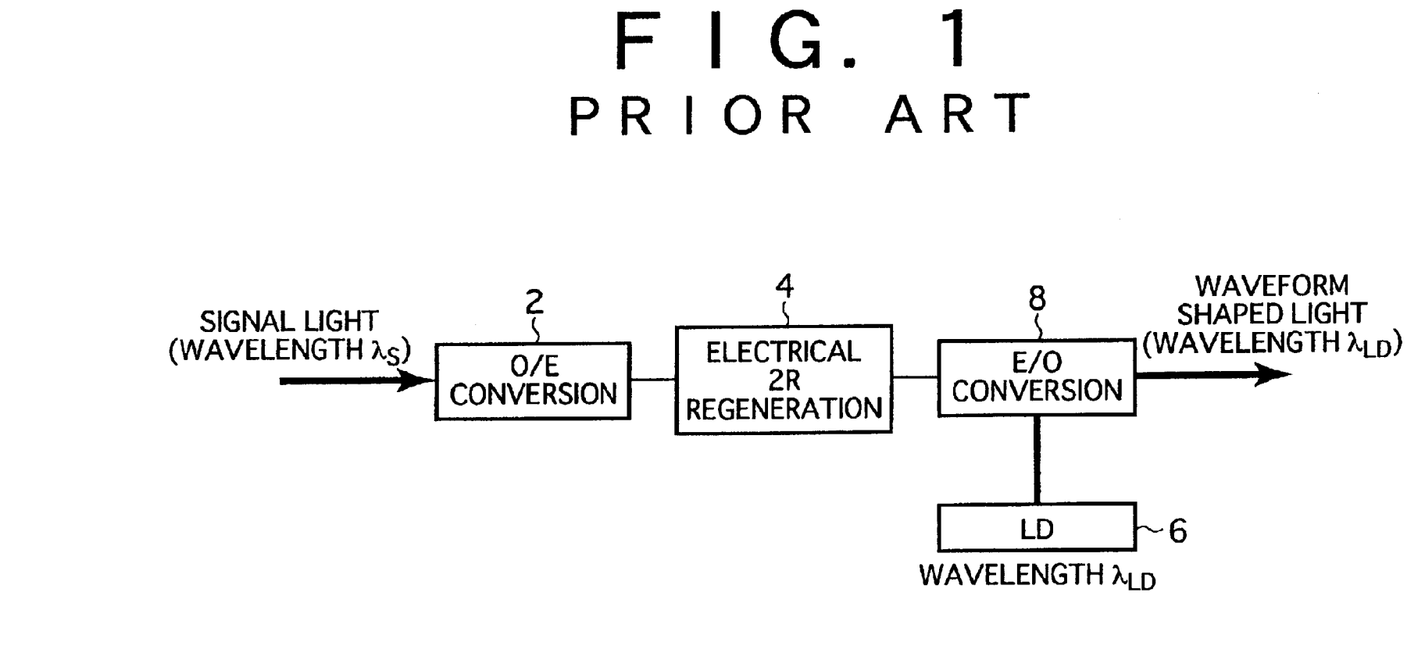
FIG. 1 is a block diagram of a waveform shaping device employing electrical processing in the prior art.

As shown in FIG. 1, a waveform shaping device used most generally in the prior art requires electrical signal processing. First, input signal light is converted into an electrical signal by an O/E converter 2. This electrical signal is next input into an electrical 2R regenerator 4 to shape the waveform of the electrical signal. Thereafter, the waveform-shaped electrical signal is converted into an optical signal by an E/O converter 8 using a laser diode (LD) 6.

In this waveform shaping method employing electrical signal processing, the modulation rate of the signal light that can be processed is limited by electrical band limitation. As a result, it is difficult to regenerate the waveform of a high-speed optical signal.

Figure 2:
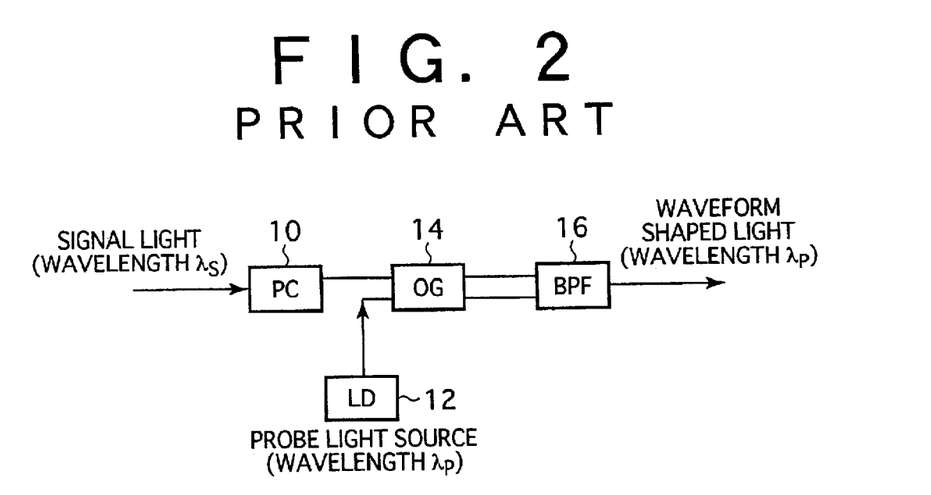
FIG. 2 is a block diagram of a waveform shaping device employing an optical circuit in the prior art.

FIG. 2 shows a conventional waveform shaping device designed to optically perform all kinds of signal processing. Signal light controlled in its polarization state by a polarization controller (PC) 10 and probe light from a laser diode (LD) 12 as a probe light source are supplied to an optical gate 14. In the optical gate 14, waveform shaped light is obtained by an optical gate operation. Thereafter, the waveform shaped light output from the optical gate 14 is extracted by an optical bandpass filter (BPF) 16, and output from this device. In this case, the wavelength of the waveform shaped light is equal to the wavelength $\lambda_p$ of the probe light. Further, the wavelength $\lambda_p$ of the probe light is set different from the wavelength $\lambda_s$ of the signal light from a necessity viewpoint of extraction of the waveform shaped light.

Examples of the optical gate 14 include a nonlinear optical loop mirror, a nonlinear switch having a Michelson or Mach-Zehnder interferometer configuration, and a switch employing a saturable absorber.

The prior art shown in FIG. 2 has a problem that polarization dependence occurs in obtaining a sufficient waveform shaping function. As shown in FIG. 2, the polarization controller 10 is required to adjust or control the polarization state of the signal light to be input into the optical gate 14, causing complexity of the device configuration.

SUMMARY OF THE INVENTION

It is therefore an object of the present invention to provide a method and device for shaping the waveform of an optical signal independently of the modulation rate and format (pattern) of the optical signal.

It is another object of the present invention to provide a method and device for shaping the waveform of an optical signal independently of the polarization state of the optical signal.

It is a further object of the present invention to provide a method and device for shaping the waveform of an optical signal which can easily simplify a device configuration.

It is a still further object of the present invention to provide a method and device for shaping the waveform of an optical signal without wavelength conversion.

In accordance with an aspect of the present invention, there is provided a method of shaping the waveform of an optical signal, comprising the steps of inputting said optical signal into a first optical gate to suppress a space-level noise of said optical signal; and inputting an optical signal output from said first optical gate into a second optical gate to suppress a mark-level noise of said optical signal output from said first optical gate.

According to this method, the first and second optical gates are cascaded. Accordingly, by using a suitable device as each of the optical gates, at least one of the objects of the present invention can be achieved.

In accordance with another aspect of the present invention, there is provided a device for shaping the waveform of an optical signal. This device comprises first and second optical gates cascaded. The first optical gate receives the optical signal to suppress a space-level noise of the optical signal, and the second optical gate receives an optical signal output from the first optical gate to suppress a mark-level noise of the optical signal output from the first optical gate.

In accordance with a further aspect of the present invention, there is provided a system including an optical fiber transmission line for transmitting an optical signal and at least one waveform shaping device arranged along said optical fiber transmission line. The waveform shaping device is the device according to the present invention.

In accordance with a still further aspect of the: present invention, there is provided a system including an optical demultiplexer for receiving WDM signal light obtained by wavelength division multiplexing a plurality of optical signals to separate said WDM signal light into said plurality of optical signals, a plurality of waveform shaping devices for receiving said plurality of optical signals output from said optical demultiplexer, respectively, and an optical multiplexer for wavelength division multiplexing a plurality of optical signals output from said plurality of waveform shaping devices. Each waveform shaping device is the device according to the present invention.

DETAILED DESCRIPTION OF THE PREFERRED EMBODIMENTS

Some preferred embodiments of the present invention will now be described in detail.

Figure 3:
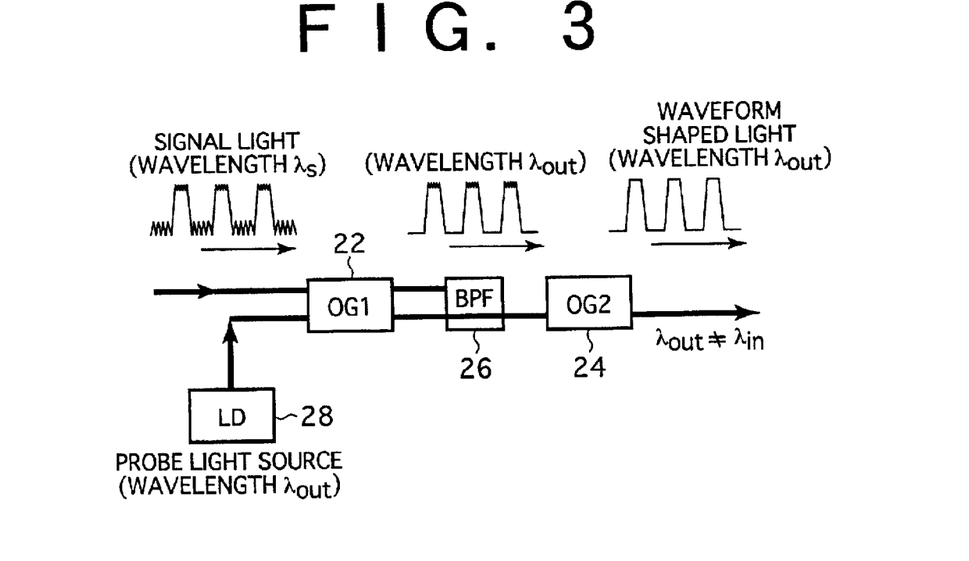
FIG. 3 is a block diagram showing a first preferred embodiment of the device according to the present invention.

FIG. 3 is a block diagram showing a first preferred embodiment of the device according to the present invention. This device includes a first optical gate (OG1) 22 and a second optical gate (OG2) 24 cascaded to each other. These optical gates 22 and 24 are optically connected by an optical bandpass filter (BPF) 26. Further, a laser diode (LD) 28 as a probe light source is optically connected to the first optical gate 22.

The probe light source 28 outputs probe light having a wavelength $\lambda_{out}$. The probe light and signal light having a wavelength $\lambda_{in}$ are input into the optical gate 22 so that the probe light and the signal light propagate in an optical medium (e.g., nonlinear optical medium) of the optical gate 22 in the same direction. The optical gate 22 is of a polarization independent type.

Of an output from the optical gate 22, light having the wavelength $\lambda_{out}$ is passed through the optical bandpass filter 26, and next input into the optical gate 24. Then, this light is passed through the optical gate 24 to obtain waveform shaped light.

In this preferred embodiment, the wavelength $\lambda_{out}$ of the probe light is set different from the wavelength $\lambda_{in}$ of the signal light, so as to separate the waveform shaped light from the signal light.

As the first optical gate 22 having no polarization dependence, an electroabsorption optical modulator may be used, for example. When a bulk type electroabsorption optical modulator is used, a polarization independent transmission characteristic can be obtained. By using a polarization independent gate as the first optical gate 22, a polarization independent operation can be provided as a whole irrespective of whether or not the second optical gate 24 has polarization dependence.

In the case that a reverse bias is being applied to an electroabsorption optical modulator, cross absorption modulation (XAM) is generated by light-injection from the outside. By this XAM, a high level and a low level of signal light as a binary code are converted into a high level and a low level of output light (wavelength $\lambda_{out}$), respectively. At this time, absorption saturation is generated by screening and band filling of an external electrical field by an optically pumped carrier, so that the output nonlinearly changes with input optical power from the outside. This principle is described in detail in "IEE Electron. Lett. Vol. 25, No. 2, pp. 88–89", for example.

By setting the power level of the input signal light to an optimum value, amplitude noise of the space level in the converted signal light (wavelength $\lambda_{out}$) can be suppressed by the above nonlinear characteristic. When the reverse bias is increased, the nonlinear transmission characteristic can be made steeper to the external input optical power. By utilizing this effect, the amplitude noise can be further compressed. However, insertion loss by the modulator increases with an increase in the reverse bias. Accordingly, it is preferable to set an optimum value of the reverse bias so that a required characteristic can be obtained.

In the polarization independent optical gate configured by such an electroabsorption optical modulator, the optically pumped carrier is withdrawn by the reverse bias, so that XAM responds at a high speed, and signal light pattern dependence can be suppressed. Accordingly, an optical gate operation independent of a transmission speed of signal light can be performed. For example, a high-speed operation at 40 Gb/s has been reported in "IEICE Trans. Electron., vol. E81-C, pp. 1251–1257, 1998". Further, since this optical gate is an optical gate based on XAM by an optical signal, the operation can be performed for signal light in an arbitrary format.

In the preferred embodiment shown in FIG. 3, the signal light and the probe light propagate in the first optical gate 22 in the same direction. Accordingly, the optical bandpass filter 26 is used to separate the resultant converted light from the signal light. To allow this separation, the wavelength $\lambda_{out}$ of the probe light is set different from the wavelength $\lambda_{in}$ of the signal light. As a result, not only waveform shaping, but also wavelength conversion can be made according to this preferred embodiment.

The converted light passed through the optical bandpass filter 26 is supplied to the second optical gate 24. The optical gate 24 has a function of suppressing amplitude noise of the mark level. In the case that the optical gate 24 has polarization dependence, the polarization state of the probe light may be preliminarily set so that the operation of the optical gate 24 becomes effective to the maximum.

As the second optical gate 24, a gain-clamped amplifier using a DFB-LD may be used. The gain-clamped amplifier functions as a limiter amplifier. By optimizing input power, for example, amplitude noise of the mark level can be effectively suppressed. The principle of operation of the limiter amplifier is described in Watanabe, "Method, device and system for waveform shaping of signal light", Japanese Patent Laid-open No. 2000-323786, for example. While the limiter amplifier has polarization dependence, an operation independent of polarization of the signal light can be performed by optimizing the polarization state of the probe light as mentioned above. Further, in a gain-clamped condition the limiter amplifier responds at a high speed of tens of picoseconds to a change in light intensity of the laser, so that the limiter amplifier can operate to an ultrahigh-speed signal of 40 Gb/s or more.

Figure 4A:
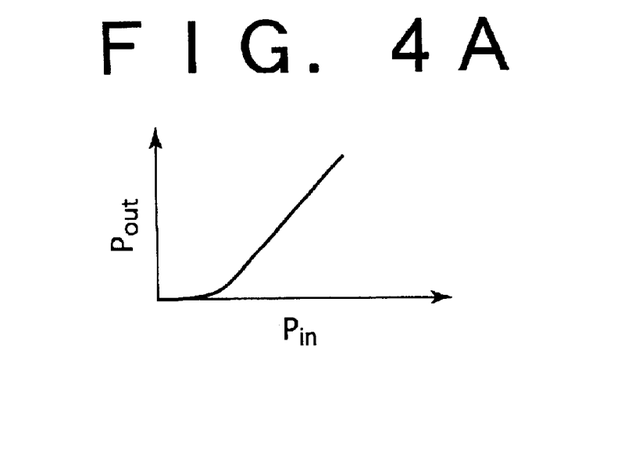
FIGS. 4A, 4B, and 4C are graphs showing input-output characteristics at different parts in the device shown in FIG. 3;.

Usually, a reverse bias of −2 to −3 V is applied to the electroabsorption optical modulator used as the first optical gate 22. FIG. 4A shows an output characteristic Pout of the probe light to input signal light power $P_{in}$. When the input power $P_{in}$ is smaller, the slope of the output power $P_{out}$ is smaller, and when the input power $P_{in}$ is larger, the slope of the output power $P_{out}$ is larger as shown in FIG. 4A. Accordingly, by utilizing this characteristic to optimize the power of the signal light, amplitude noise of the space level can be suppressed. Usually, a power of about 10 dBm is required for utilization of XAM.

Figure 4B:
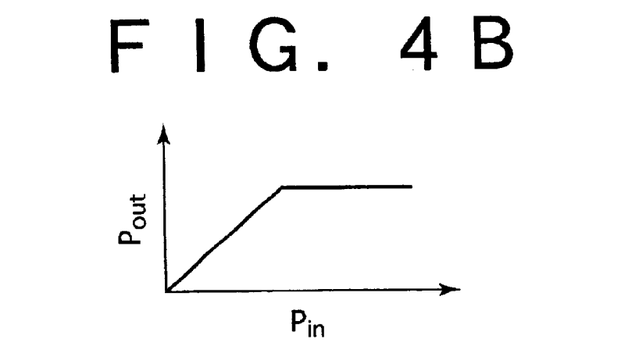

FIG. 4B is a graph showing an output characteristic of the gain-clamped amplifier usable as the second optical gate 24 as similar to the graph shown in FIG. 4A. Usually, assist light is additionally input into the gain-clamped amplifier, thereby stabilizing the operation. As shown in FIG. 4B, the output power $P_{out}$ substantially linearly increases with an increase in the input power $P_{in}$ up to a certain value, and when the input power $P_{in}$ becomes greater than the certain value, the output power $P_{out}$ is substantially constant. Accordingly, by optimizing the power of the signal light, amplitude noise of the mark level can be suppressed.

Figure 4C:
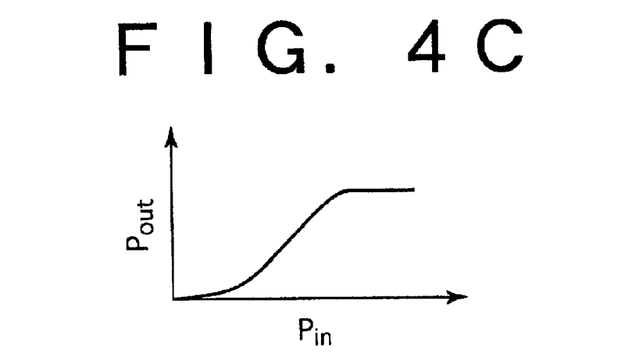

FIG. 4C shows an output characteristic obtained by combining the characteristic shown in FIG. 4A and the characteristic shown in FIG. 4B. That is, the characteristic shown in FIG. 4C is a characteristic of the whole device shown in FIG. 3. According to this preferred embodiment, the optical gates 22 and 24 having required characteristics are cascaded, so that amplitude noise of both the space level and the mark level can be suppressed by using the device shown in FIG. 3.

Figure 5:
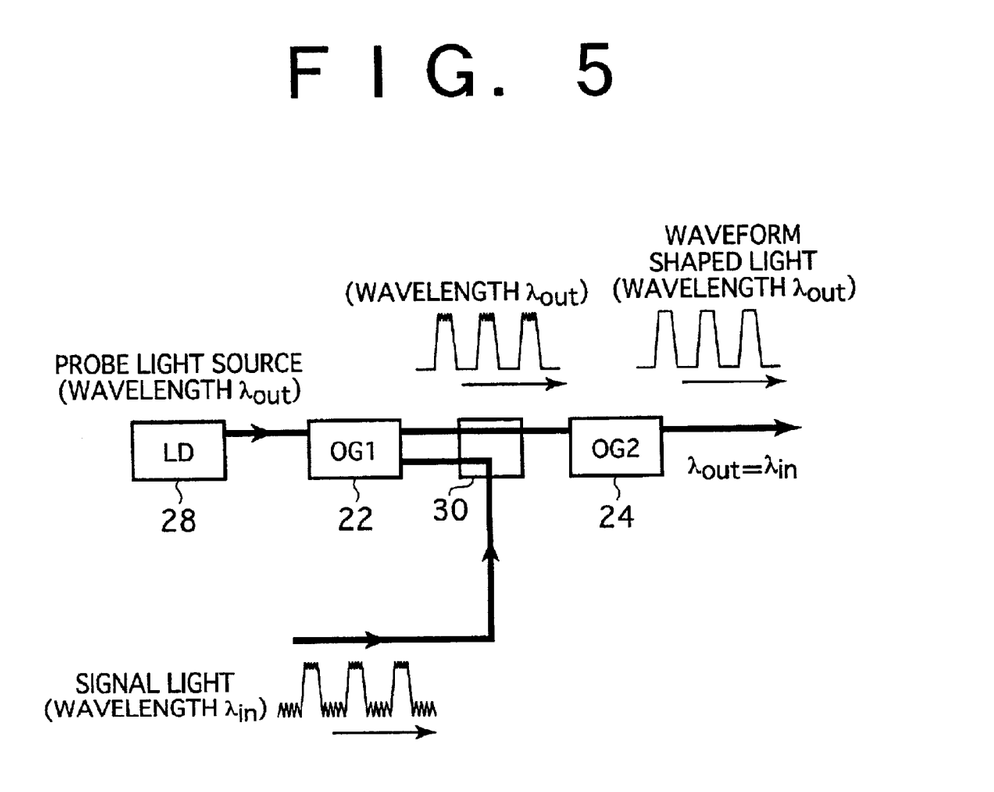
FIG. 5 is a block diagram showing a second preferred embodiment of the device according to the present invention.

Referring to FIG. 5, there is shown a second preferred embodiment of the device according to the present invention. In contrast to the preferred embodiment shown in FIG. 3, the second preferred embodiment is characterized in that optical paths are set so that the probe light and the signal light propagate in the first optical gate 22 in opposite directions. That is, an optical coupler 30 is provided between the first optical gate 22 and the second optical gate 24 in place of the optical bandpass filter 26 (see FIG. 3). The signal light is input through the optical coupler 30 into the first optical gate 22 from the second optical gate 24 side, and the probe light from the probe light source 28 is input into the first optical gate 22. As the optical coupler 30, a semitransparent mirror, 3-dB coupler, optical circulator, or the like may be used.

According to this preferred embodiment, amplitude noise of both the mark level and the space level can be suppressed as in the preferred embodiment shown in FIG. 3, and the optical bandpass filter 26 can be eliminated.

In this preferred embodiment, an antireflection coating or oblique polishing is preferably applied to the end surface of the first optical gate 22, so as to sufficiently suppress the reflection of the signal light incident on the end surface of the first optical gate 22. With this configuration, crosstalk due to the incidence of the reflected signal light on the second optical gate 24 can be effectively prevented.

While the optical bandpass filter 26 shown in FIG. 3 is an independent member, a filter film such as a dielectric multilayer film may be formed on the output end surface of the optical gate 22, thereby obtaining a similar function.

According to the preferred embodiment shown in FIG. 5, the optical bandpass filter 26 shown in FIG. 3 is not required. Accordingly, the relation between the wavelength $\lambda_{in}$ of the signal light and the wavelength $\lambda_{out}$ of the probe light is arbitrary. That is, $\lambda_{in}$ and $\lambda_{out}$ may be set equal to each other. Thus, waveform shaping not accompanied by wavelength conversion can be performed. In contrast, such waveform shaping is impossible in the preferred embodiment shown in FIG. 3.

Figure 6:
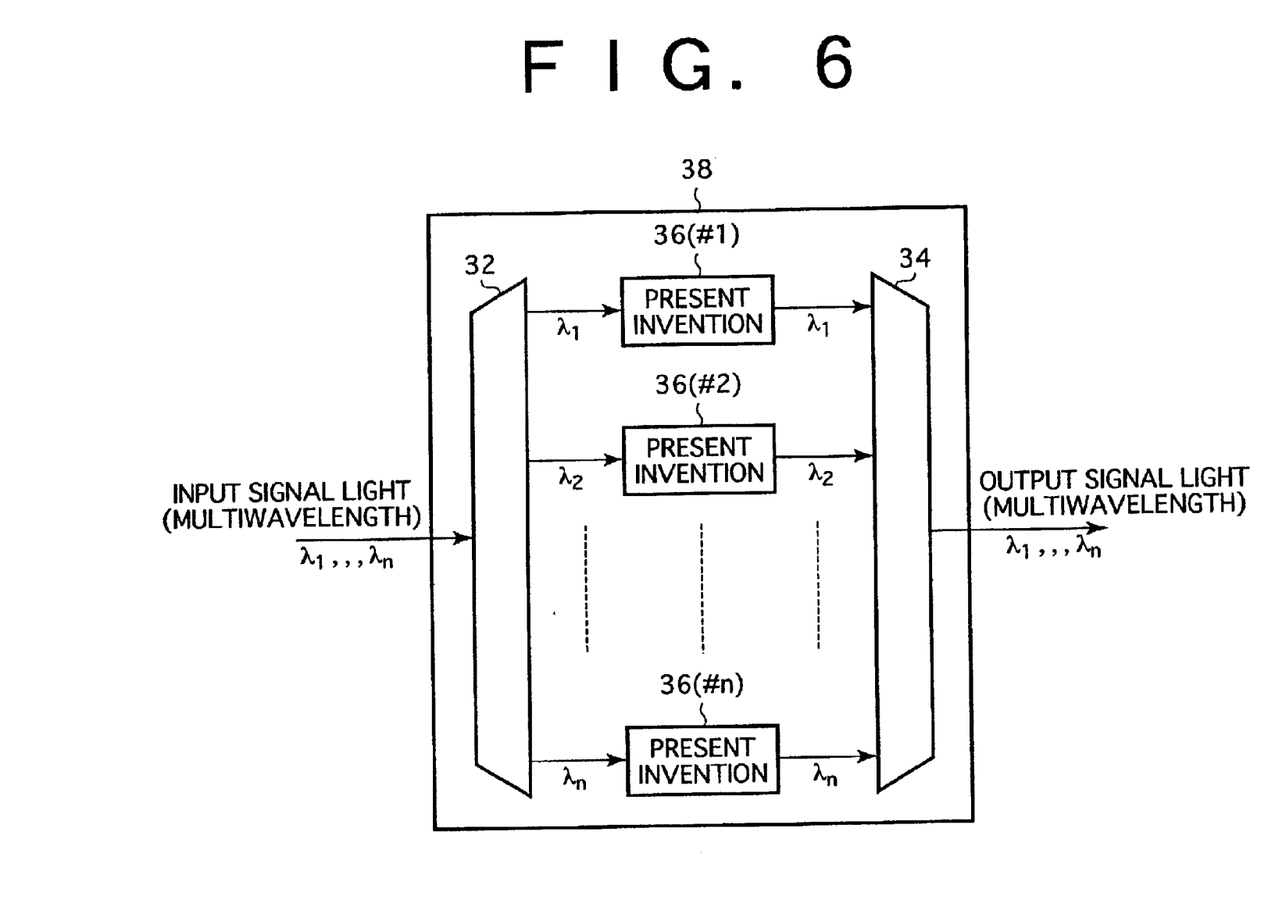
FIG. 6 is a block diagram showing a first preferred embodiment of the device (system) according to the present invention.

FIG. 6 is a block diagram showing a third preferred embodiment of the device (system) according to the present invention. In this preferred embodiment, the present invention is applied to wavelength division multiplexing (WDM). Accordingly, the signal light input into the system is WDM signal light obtained by wavelength division multiplexing a plurality of optical signals having different wavelengths $\lambda_1$ to $\lambda_n$ (n is an integer greater than 1). An optical demultiplexer 32 is used to divide the input WDM signal light into the plural optical signals respectively having the wavelengths $\lambda_1$ to $\lambda_n$. These optical signals output from the optical demultiplexer 32 are supplied to a plurality of devices 36(#1) to 36(#n) according to the present invention, respectively. In the devices 36(#1) to 36(#n), the respective optical signals undergo waveform shaping. Thereafter, the optical signals output from the devices 36(#1) to 36(#n) are supplied to an optical multiplexer 34 to obtain WDM signal light, and the resultant WDM signal light is output from the system.

As each of the optical demultiplexer 32 and the optical multiplexer 34, an arrayed waveguide grating may be used, for example. In this case, the optical demultiplexer 32, the optical multiplexer 34, and the devices 36(#1) to 36(#n) according to the present invention can be easily integrated on a substrate 38 formed of S1 or the like. Accordingly, the waveform shaping system applicable to WDM can be made greatly compact.

Figure 7:
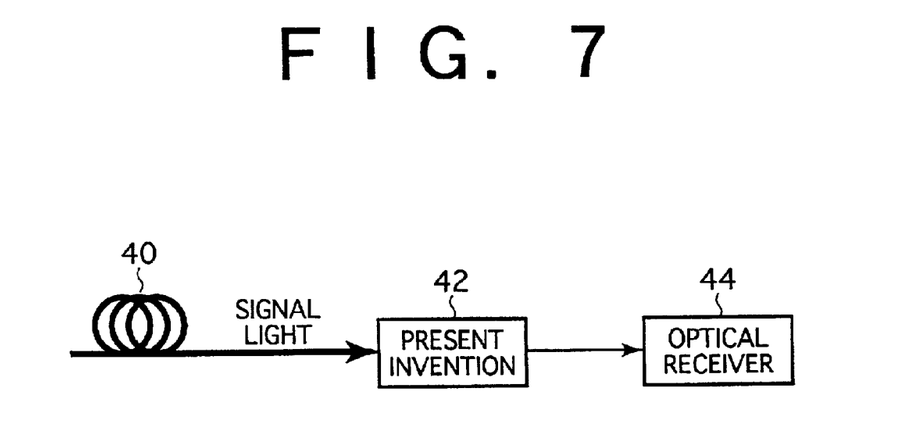
FIG. 7 is a block diagram showing a first preferred embodiment of the device (system) according to the present invention.

FIG. 7 is a block diagram showing a fourth preferred embodiment of the device (system) according to the present invention. In this preferred embodiment, a device 42 according to the present invention is arranged along an optical fiber transmission line 40 for transmitting the signal light. An optical receiver 44 is provided downstream of the device 42 according to the present invention. Alternatively, the device 42 according to the present invention may be provided at a most downstream end of the optical fiber transmission line 40. Further, a plurality of devices according to the present invention may be arranged along the optical fiber transmission line 40.

With this configuration, the signal light transmitted by the optical fiber transmission line 40 undergoes waveform shaping in accordance with the principle of the present invention. Accordingly, the waveform-shaped signal light received by the optical receiver 44 can obtain a better SN ratio.

It is known that the degradation in SN ratio of signal light is one of the factors of transmission limit to signal light. To increase a transmission distance, the improvement in SN ratio is desirable. However, an optical receiver now in use has no additional function of improving the SN ratio of signal light, and any method of shaping the waveform of a high-speed signal with a compact and simple configuration of an electronic circuit has not yet been established.

The device 42 according to the present invention can shape the waveform of high-speed signal light without O/E conversion independently of a bit rate. Accordingly, by placing the device 42 upstream of the optical receiver 44, a required receiving power in the optical receiver 44 can be reduced. Further, by maintaining a receiver sensitivity constant, the transmission distance can be increased.

According to the present invention as described above, it is possible to provide a method and device for shaping the waveform of signal light independently of the modulation rate and format of the signal light. Furthermore, it is possible to provide a method and device for shaping the waveform of signal light independently of the polarization state of the signal light. Furthermore, it is possible to provide a method and device for shaping the waveform of signal light which can easily simplify a device configuration. Furthermore, it is possible to provide a method and device for shaping the waveform of signal light with or without wavelength conversion.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of shaping the waveform of an optical signal, comprising the steps of:
    inputting said optical signal into a first optical gate to suppress a space-level noise of said optical signal; and
    inputting an optical signal output from said first optical gate into a second optical gate to suppress a mark-level noise of said optical signal output from said first optical gate.

2. A method according to claim 1, wherein said first optical gate has polarization independence.

3. A method according to claim 1, wherein said first optical gate comprises an electroabsorption optical modulator.

4. A method according to claim 1, wherein said second optical gate comprises a limiter optical amplifier.

5. A method according to claim 1, wherein said second optical gate comprises a gain-clamped optical amplifier including a DFB-LD.

6. A method according to claim 1, further comprising the step of inputting probe light into said first optical gate.

7. A method according to claim 6, wherein:
    said probe light has a wavelength different from the wavelength of said optical signal input into said first optical gate; and
    said optical signal output from said first optical gate has the same wavelength as the wavelength of said probe light.

8. A method according to claim 7, wherein said probe light is input into said first optical gate in the same direction as that of said optical signal input into said first optical gate.

9. A method according to claim 8, further comprising the step of separating said optical signal output from said first optical gate from said optical signal input into said first optical gate.

10. A method according to claim 6, wherein said probe light has the same wavelength as the wavelength of said optical signal input into said first optical gate.

11. A method according to claim 10, wherein said probe light is input into said first optical gate in a direction opposite to that of said optical signal input into said first optical gate.

12. A device for shaping the waveform of an optical signal, comprising:
    first and second optical gates cascaded;
    said first optical gate receiving said optical signal to suppress a space-level noise of said optical signal;
    said second optical gate receiving an optical signal output from said first optical gate to suppress a mark-level noise of said optical signal output from said first optical gate.

13. A device according to claim 12, wherein said first optical gate has polarization independence.

14. A device according to claim 12, wherein said first optical gate comprises an electroabsorption optical modulator.

15. A device according to claim 12, wherein said second optical gate comprises a limiter optical amplifier.

16. A device according to claim 12, wherein said second optical gate comprises a gain-clamped optical amplifier including a DFB-LD.

17. A device according to claim 12, further comprising a probe light source for inputting probe light into said first optical gate.

18. A device according to claim 17, wherein:
    said probe light has a wavelength different from the wavelength of said optical signal input into said first optical gate; and
    said optical signal output from said first optical gate has the same wavelength as the wavelength of said probe light.

19. A device according to claim 18, wherein said probe light is input into said first optical gate in the same direction as that of said optical signal input into said first optical gate.

20. A device according to claim 19, further comprising means for separating said optical signal output from said first optical gate from said optical signal input into said first optical gate.

21. A device according to claim 17, wherein said probe light has the same wavelength as the wavelength of said optical signal input into said first optical gate.

22. A device according to claim 21, wherein said probe light is input into said first optical gate in a direction opposite to that of said optical signal input into said first optical gate.

23. A system comprising:
    an optical fiber transmission line for transmitting an optical signal; and
    at least one waveform shaping device arranged along said optical fiber transmission line;
    said waveform shaping device comprising:
        first and second optical gates cascaded;
        said first optical gate receiving said optical signal to suppress a space-level noise of said optical signal;
        said second optical gate receiving an optical signal output from said first optical gate to suppress a mark-level noise of said optical signal output from said first optical gate.

24. A system comprising:
    an optical demultiplexer for receiving WDM signal light obtained by wavelength division multiplexing a plurality of optical signals to separate said WDM signal light into said plurality of optical signals;
    a plurality of waveform shaping devices for receiving said plurality of optical signals output from said optical demultiplexer, respectively; and
    an optical multiplexer for wavelength division multiplexing a plurality of optical signals output from said plurality of waveform shaping devices;
    each of said waveform shaping devices comprising:
        first and second optical gates cascaded;
        said first optical gate receiving said optical signal input into each waveform shaping device to suppress a space-level noise of said optical signal;
        said second optical gate receiving an optical signal output from said first optical gate to suppress a mark-level noise of said optical signal output from said first optical gate.

* * * * *

UNITED STATES PATENT AND TRADEMARK OFFICE
CERTIFICATE OF CORRECTION

PATENT NO. : 6,738,179 B2
APPLICATION NO. : 09/994790
DATED : May 18, 2004
INVENTOR(S) : Fumio Futami et al.

It is certified that error appears in the above-identified patent and that said Letters Patent is hereby corrected as shown below:

Title Page
Item [56] Other Publications, M. Suzuki reference, Col. 2, Line 13, change "GainAsP" to --GaInAsP--.

Signed and Sealed this

Seventeenth Day of April, 2007

JON W. DUDAS
*Director of the United States Patent and Trademark Office*